Figure 1:
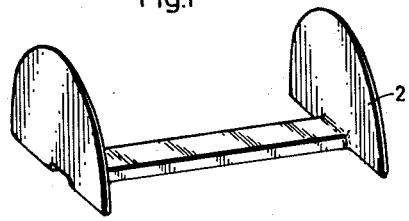

Jan. 30, 1962  H. GEYER ET AL  3,019,375
HEAT-RESISTANT COIL FORMER, ESPECIALLY FOR ELECTRICAL RELAYS
Filed April 7, 1958

Inventors
Hans Geyer, and
Josef Fischer,
By
Atty.

United States Patent Office 3,019,375
Patented Jan. 30, 1962

3,019,375
HEAT-RESISTANT COIL FORMER, ESPECIALLY FOR ELECTRICAL RELAYS
Hans Geyer and Josef Fischer, Munich, Germany, assignors to Siemens & Halske Aktiengesellschaft, Berlin and Munich, Germany, a corporation of Germany
Filed Apr. 7, 1958, Ser. No. 726,958
Claims priority, application Germany Apr. 12, 1957
6 Claims. (Cl. 317—158)

The present invention relates to a coil form which may be subjected high temperatures, and is especially applicable to electrical relays. Coil forms have such a versatility of employment that numerous variations are utilized. Usually they are produced of insulating materials, such as paper, hard paper, or synthetic resin, which permit inexpensive production but have the disadvantage of low temperature stability. Forms of metal have to be additionally insulated and may not employ a one piece construction, as it would create a short-circuit winding, which could be used only in exceptional cases. For these reasons the utilization of metal therein is uneconomical. Forms of sheet metal soldered together or made by injection molding are known; but heretofore the latter ones were formed in one-piece but split in their longitudinal direction to avoid a short circuit. All these forms both of injection molding or of the other mentioned materials utilize comparatively thick walls and their corners must be round for easy removal from the mold. As a result, their weight becomes excessive and the usable winding space small. Divided forms are also known. These are employed particularly where the core cannot, as a result of the particular construction of the form or core, be inserted in a one-piece form.

An object of the invention is to produce a heat-resistant form for windings of electrical apparatus, especially relays, constructed from a thin heat-resistant insulated sheet. According to the invention the form is composed of two half shells disposed in opposition to each other, each half being equipped with flanges on both ends, and formed from one piece of sheet metal, coated with a heat-resistant electrical insulating film, and held together only by turns of the windings disposed between the flanges. The new form has a large usable winding space as a result of the use of thin sheet metal and corresponding minimum bulk. The arrangement is particularly effective, if both the half shells are butt-jointed, which is readily possible with thin sheets of about 0.5 mm., without requiring any supplementary means. This is of especial importance, if the form is used as a short-circuit winding in which case its halves are not, as usual, insulated at their abutting edges.

To facilitate bringing out of the winding leads, the flanges may be spaced at their opposed edges to form a gap through which the leads may be brought.

Depending upon the material employed and the particular application, the molded sheet parts can be differently insulated. Forms of brass or iron, such as used in insensitive relays, may be coated with a heat-resistant film of varnish, for example, one containing silicons. Forms of iron can also be coated with enamel. When using aluminium sheet, following molding, the half shells may be coated with an insulating sheath of alumina. Another solution would be the use of sheet mica as the insulation, which is absolutely heat-resistant, requires little thickness, and, therefore, wastes little winding space.

Figure 2:
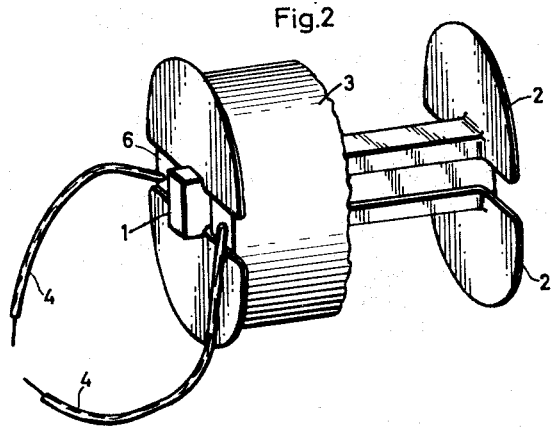
Figure 3:
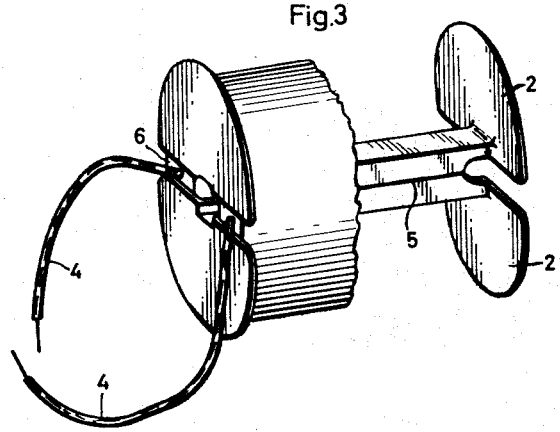

In order that the said invention may be clearly understood and readily carried into effect, the same will now be more fully described with reference to the accompanying drawing, in which:

FIG. 1 illustrates a half shell formed of sheet metal in one piece and bearing two semicircular flanges; and FIGS. 2 and 3 respectfully illustrate examples of different forms composed of such half shells.

According to FIG. 2 both of the half shells 2 are so mounted on the core 1, which is of rectangular cross section, that they are in spaced opposed relation forming the gap 6 at which the lead ends 4 of the winding may be brought out.

According to FIGURE 3 the molded sheet parts are provided with respective longitudinal edges 5 which are disposed in abutting relation while corresponding flanges 2 are disposed in spaced relation to form gap 6 through which the lead ends of the winding may be brought. As the winding 3 is wrapped on the abutting halves the two shells are exclusively held together by this winding. The employed sheet, e.g. aluminium sheet coated with a film of alumina ($Al_2O_3$), may be very thin, sheet gauges of 0.5 mm. meeting the demands for relays.

Relays having delayed operation or release need, in addition to the exciting winding, a short-circuit winding. In the embodiment according to FIGURE 3 such a winding may be easily obtained by elimination of the insulating film or coating on the abutting longitudinal edges of the shell halves. Therefore, following insulation of both the half shells by anodisation with an insulating sheath of alumina, such insulation may be removed from the particular edges, whereby the shells may lie conductively against each other and thus form a short-circuit winding.

Changes may be made within the scope and spirit of the appended claims which define what is believed to be new and desired to have protected by Letters Patent.

We claim:

1. An assembly for electrical devices of the class of relays and the like, comprising a heat-resistant spool carrying a coil winding, said spool comprising two half-shells, each half-shells made integrally of one ipece of sheet metal less than 1 millimeter thick and forming a central cross-sectionally troughlike elongated portion having a flange portion radially outwardly extending therefrom at each end thereof for a distance which is a multiple of the corresponding radial dimension of said central portion, each half-shell at least in part coated with a heat-resistant electrically insulating film, said half-shells being positioned with said elongated portions in opposed relation and corresponding flanges extending in opposite directions whereby the inner edges of one half-shell face corresponding inner edges of the other half-shell, said coil winding disposed on the central portions of said half-shells between the flanges formed by the flange portions at the opposite ends thereof and constituting the sole means for holding said half-shells in assembled position.

2. An assembly according to claim 1, wherein said half-shells are positioned with the inner edges thereof in directly abutting engagement.

3. An assembly according to claim 1, wherein said flanges are radially outwardly recessed from the plane of the inner edges of the respective central portions of said half-shells, the inner edges of said central portions being positioned in abutting engagement, the opposed inner edges of said recessed flange portions forming a gap therebetween for accommodating leads extending from said coil winding.

4. An assembly according to claim 1, wherein aluminium constitutes the sheet metal of which said half-shells are formed, a coating of alumina constituting said insulating film.

5. An assembly according to claim 1, comprising a mica sheet for insulating said half-shells respectively from one another and from said coil winding.

6. An assembly according to claim 1, wherein the inner edges of at least said central portion are positioned in directly abutting and electrically conductive engagement.

References Cited in the file of this patent
UNITED STATES PATENTS 2,405,457   Sinks ------------------ Aug. 6, 1946